United States Patent [19]

Menk

[11] 4,185,947
[45] Jan. 29, 1980

[54] WAVE-ACTUATED ENERGY TRANSFER APPARATUS

[76] Inventor: F. C. Menk, 506 E. Beverley St., Staunton, Va. 24401

[21] Appl. No.: 865,339

[22] Filed: Dec. 28, 1977

[51] Int. Cl.² ............................................. F03B 13/12
[52] U.S. Cl. .................................... 417/333; 60/497; 60/501; 60/504
[58] Field of Search ................ 60/495, 497, 498, 501, 60/504; 417/330, 331, 333; 290/53, 42

[56] References Cited

U.S. PATENT DOCUMENTS

| | | | |
|---|---|---|---|
| 1,555,682 | 9/1925 | McKnight | 60/498 |
| 1,818,066 | 8/1931 | Jouy | 60/498 |
| 1,953,285 | 4/1934 | Arner | 60/498 |
| 4,091,618 | 5/1978 | Jackson | 417/333 X |

*Primary Examiner*—Allen M. Ostrager
*Assistant Examiner*—Stephen F. Husar
*Attorney, Agent, or Firm*—Cushman, Darby & Cushman

[57] ABSTRACT

Apparatus for transferring the kinetic energy of waves in a body of water into other, more useful forms of energy. A float which rides upon the surface of the waves is attached to a piston by means of ropes. The piston moves within a stationary cylinder forcing water through an opening at the top of the cylinder into a vertically extending pipe. A one-way valve in the pipe prohibits water from flowing back into the cylinder. As the water overflows from the top of the pipe, the kinetic energy developed as it falls can be used, for example, to power a turbine. The length of the ropes between the float and the piston are automatically controlled so that the range of motion of the piston does not change as the average level of water changes.

20 Claims, 4 Drawing Figures

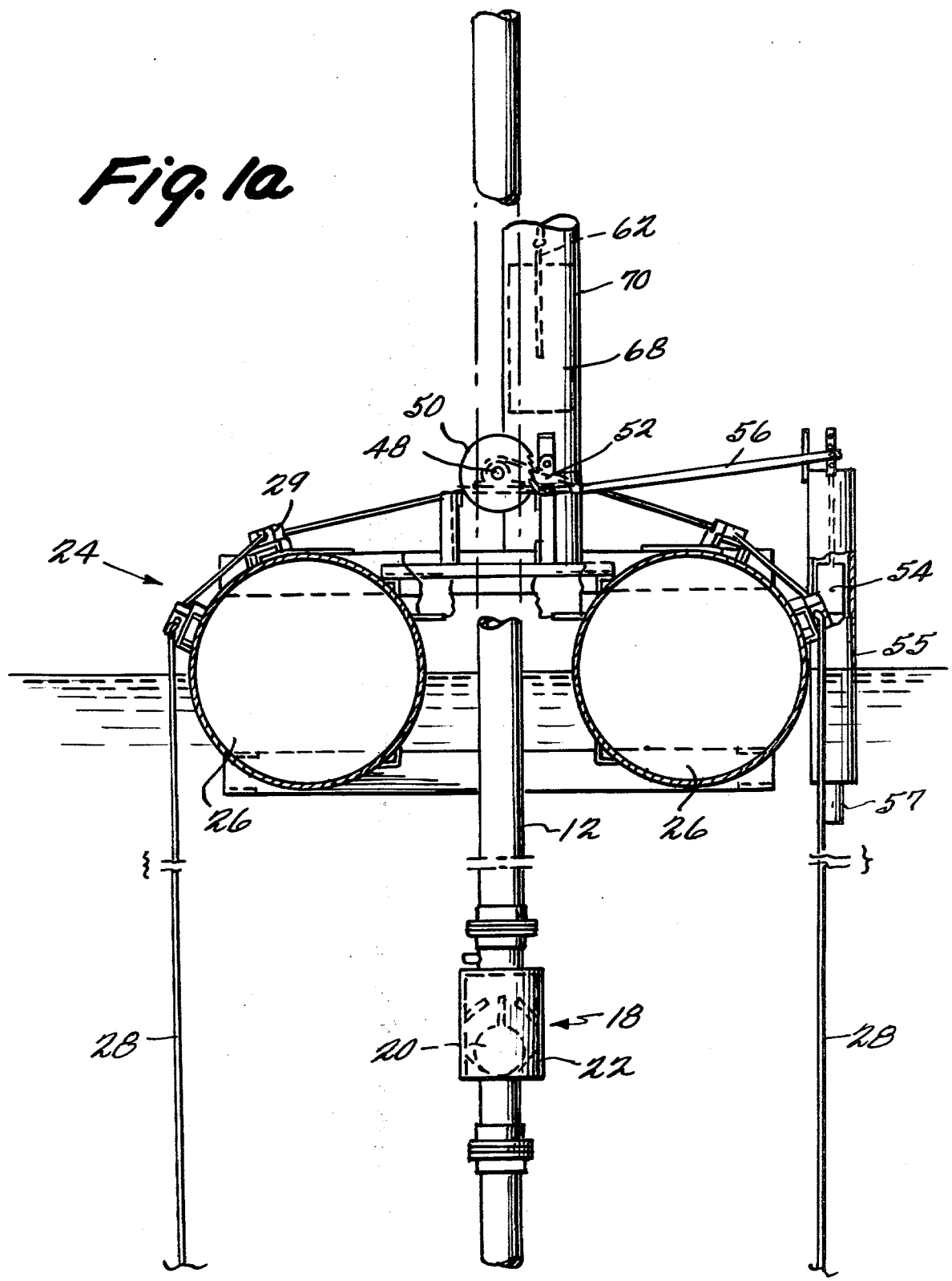

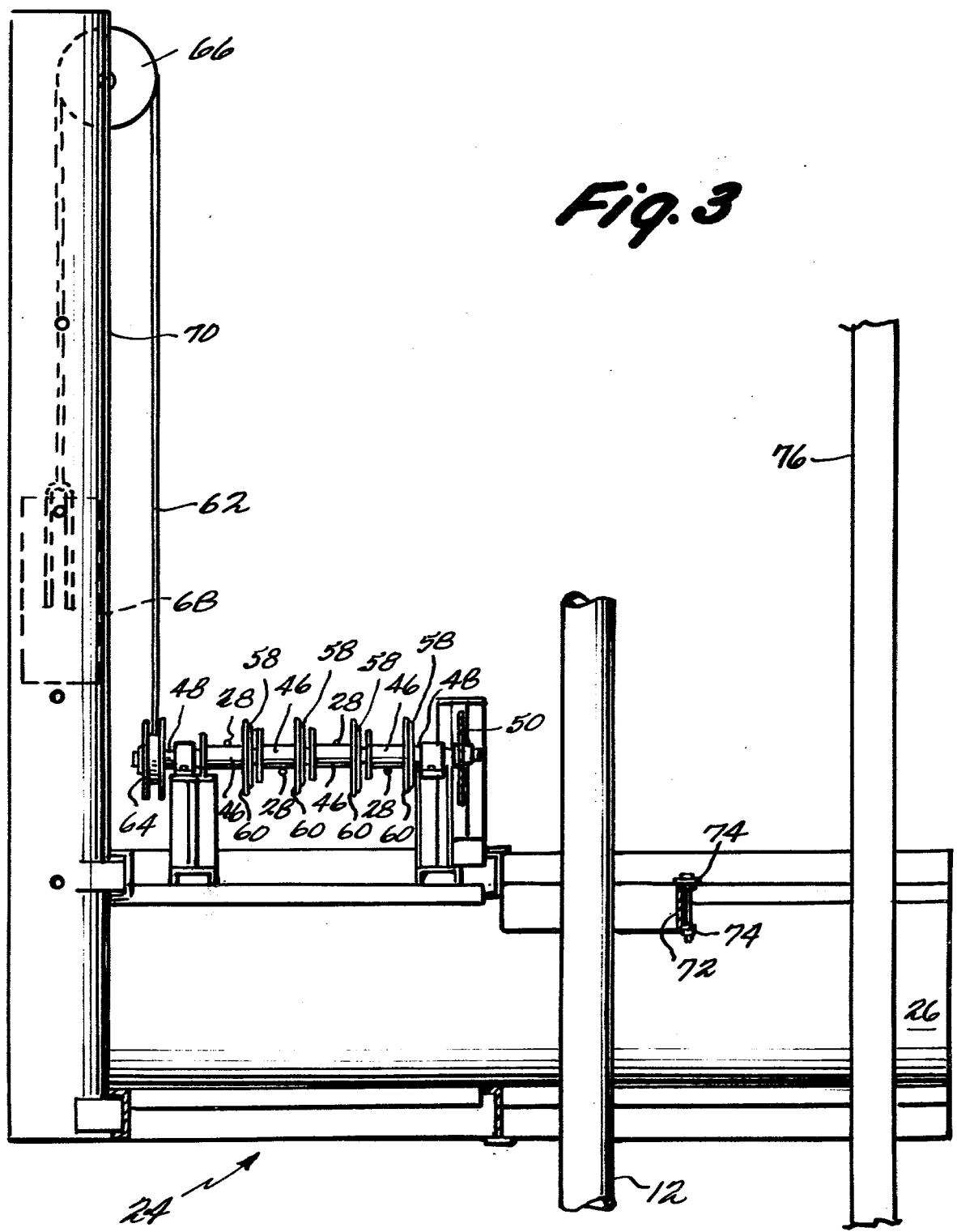

WAVE-ACTUATED ENERGY TRANSFER APPARATUS

BACKGROUND AND BRIEF DESCRIPTION OF THE INVENTION

This application relates generally to apparatus for transferring the kinetic energy of waves in a body of water into other forms of energy. Specifically, the invention relates to such apparatus which automatically compensates for variations in the average level of the body of water.

Many devices are known which convert the energy of waves into other forms of energy, generally employing a buoy which floats upon the surface of the waves and which is attached to the piston of a pump, while the cylinder of the pump is held stationary. Apparatus as described above is disclosed in the following U.S. Pat. Nos.: 510,741 Walker, 450,434 Thomas, 2,855,851 Shumen, 429,617 Gray, 886,931 Bosworth, 1,073,214 Carr, 1,324,335 Bradford, et al, 1,589,403 Krause, 1,594,050 Connor, 1,962,047 Young, 3,487,228 Kriegel, 3,515,889 Kammerer, 646,199 Walker, 693,270 Hannan, 2,871,790 Weills, 3,569,725 Rosenberg.

However, none of the above-mentioned patents disclose apparatus which automatically adjusts for variations in the average level of the body of water (e.g., as caused by tides).

U.S. Pat. No. 1,953,285 to Arner, issued Apr. 3, 1934, discloses a wave motor which does automatically adjust for the average water level. However, the device is quite complicated, and would be prone to failure in an environment typically found around large bodies of water, particularly salt-water bodies.

In the preferred embodiment of the present invention, a cylinder with an open bottom and an opening in the top is held in a stable position underwater. The opening in the top is connected to a pipe extending vertically far above the water. The pipe contains a one-way valve which prohibits water above the valve from returning to the cylinder. A float, positioned above the cylinder, is attached to a piston by means of flexible lines. As the float rises and falls with the waves the piston moves within the cylinder, forcing water up the pipe. The lines are connected to a shaft on the float which can be rotated to adjust the length of the lines between the float and the cylinder so that the range of motion of the piston remains constant during all tidal conditions. The lines wrapped around the rotatable shaft provide a much more simple and durable adjustment mechanism than the prior art.

These and other objects and advantages of the invention will become more apparent and more readily appreciated in the following detailed description of the presently preferred exemplary embodiment of the invention taken into conjunction with the accompanying drawings, in which: dr

BRIEF DESCRIPTION OF THE DRAWINGS

FIG. 1a is an elevational section on center of the upper portion of this invention;

FIG. 3 is a sectional view taken along the 3—3 line of FIG. 2.

DETAILED DESCRIPTION OF THE INVENTION

Figure 1B:
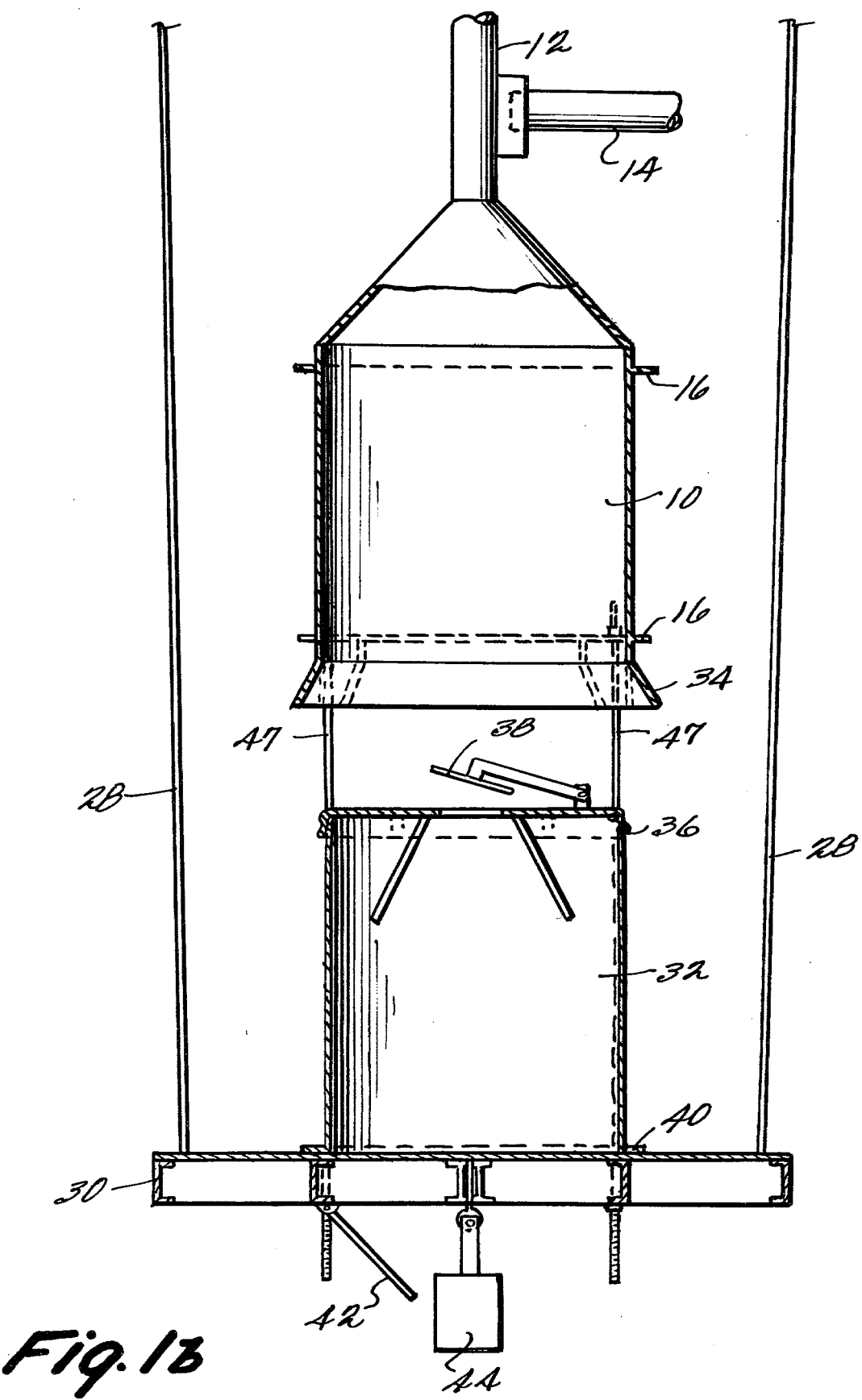
FIG. 1b is an elevational section on center of the lower portion of this invention.

Referring first to FIGS. 1a and 1b, cylinder 10, having a vertically oriented axis and an open bottom, and pipe 12, extending vertically from the top of cylinder 10, are rigidly connected to a support by brackets 14. Cylinder 10 is positioned below the lowest average water level, while at least a significant portion (preferably at least 100 feet) of pipe should rise above the surface. Cylinder 10 and pipe 12 may be attached to a stationary support such as a pier, piling, rock or a steel frame, or cylinder 10 and pipe 12 may be attached to a large floating object which has enough inertia to overcome, to a significant degree, the oscillative affect of waves as would be the case with a large floating ship, barge, hull, raft, or any other suitable vessel. Two circular plates 16 around cylinder 10 reinforce and maintain the shape of cylinder 10.

Coupled to pipe 12 is a one-way valve 18 comprised a ball float 20 and chamber 22. One-way valve 18 permits water to flow freely upwards through the valve, but prohibits the flow of water back toward cylinder 10 when the water pressures around valve 18 are such that ball 20 seats upon the lower entrance of chamber 22. Ball 20 is hollow having two or three small weep holes that permit it to fill with water so that its buoyancy approximates the buoyancy of water.

Cylinder 10 and pipe 12 are the only relatively stationary parts of the invention. The remainder of the apparatus rises and falls synchronously with the waves.

Piston 32, suitably attached to the open frame-work of piston frame 30, is sized to fit within cylinder 10, which flares at the bottom (as indicated by numeral 34) to guide piston 32. Piston ring 36 improves the fit of piston 32 within cylinder 10. One-way valve 38 permits water to flow upwards but prohibits water from flowing downward through an opening in the top of piston 32. When piston 32 has entered cylinder 10 to its maximum extent, plate 40 on piston 32 contacts the bottom edge of flared portion 34 of cylinder 10. All openings in piston frame 30 have hinged screens such as screen 42 to allow easy access for inspection and maintenance, but to prevent the fouling of the apparatus by substances in the water. Weight 44 is attached to piston frame 30.

A plurality of guide rods 47 (only two are shown) linking cylinder 10 with piston frame 30, guide piston 32 within cylinder 10 and limit the downward vertical travel of piston 32. Each guide rod 47 is threaded on both ends to allow for the adjustment of vertical travel and the guiding of piston 32 into cylinder 10. To quickly engage or release rods 47, the ends of rods 47 are supported over slotted supports and are held in place by slidable key rods. Separation of cylinder 10 from piston 32 is accomplished by simply pulling the key rods.

Figure 2:
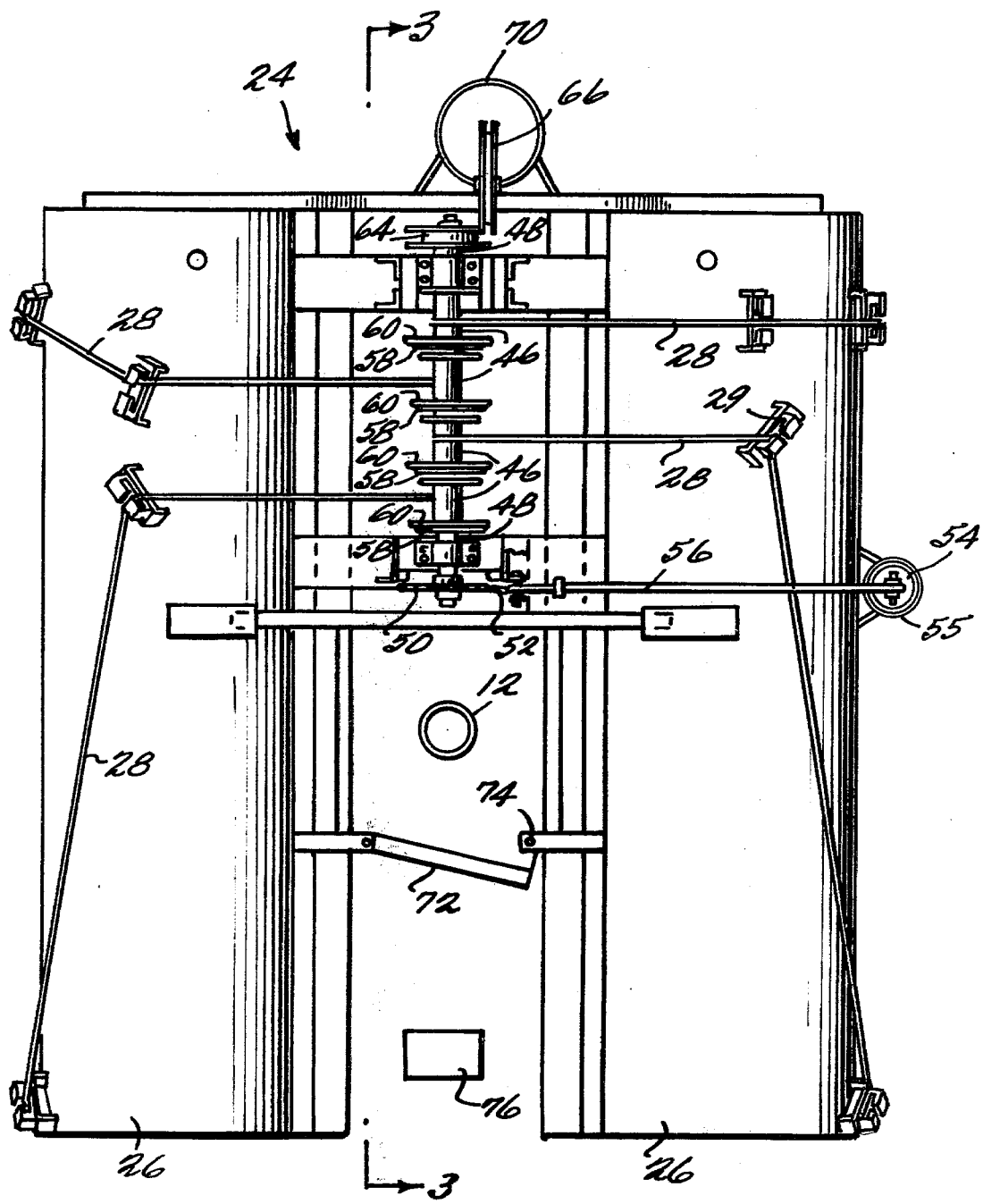
FIG. 2 is a plan view of the main float assembly.

As illustrated in FIGS. 1a, 2 and 3, float unit 24 floats upon the surface of the water due to the buoyancy of pontoons 26, and is guided in its vertical movement by pipe 12. Each line 28, connecting float unit 24 to piston frame 30, is attached to and wrapped around a spool 46 on shaft 48 so that when shaft 48 turns counterclockwise when viewed as in FIG. 1a, all ropes 28 are wound upon spools 46. Lines 28 are preferably made of nylon and are guided over float pontoons 26 by means of supports such as support 29. Ratchet 50 is attached to the end of shaft 48 and has teeth arranged so as to prohibit the unwrapping of lines 28 while pawl 52 is engaged. The engagement or disengagement of pawl 52 is controlled by control float 54 which is linked to pawl 52 by ratchet control arm 56. Control float 54 travels vertically in float control cylinder 55 which has a partially obstructed bottom 57 so that the effect of short term variations in the water level outside of cylinder 55 is greatly reduced within cylinder 55.

Spools 46 may turn freely on shaft 48. Key plates 58 are welded onto shaft 48. Spool plate 60 of spools 46 can be fastened to key plates 58 so that spools 46 become rigidly attached to shaft 48.

Line 62 (in FIG. 3) wraps around take-up sheave 64, attached to the end of shaft 48 opposite ratchet 50, in a direction opposite to lines 28, so that when lines 28 unwrap, line 62 wraps around sheave 64. Line 62 extends over pulley 66 and attaches to counterweight 68 which travels vertically in stack pipe 70. The arrangement is such that counterweight 68 resists the unwrapping of lines 28 from spools 46. Line 62 may be of any material, for example, $\frac{3}{8}$ inch nylon rope. Counterweight 68 is preferably made of concrete, although a heavier aggregate may be used if necessary. The weight of counterweight 68 must be less than that of piston 32, piston frame 30, and weight 44, but its weight must be sufficient to keep a fairly strong tension on lines 28.

Main float unit 24 is held in position about pipe 12 by means of gate 72. Gate 72 is held closed by a pin through holes 74. The construction of gate 72 permits the easy and quick positioning and removal of float unit 24. Support 76 extends parallel to pipe 12 and prohibits the turning of float unit 24 about pipe 12. Pipe 12 is preferably protected by bumpers over the distance that float unit 24 travels so that it is not damaged by the movement of float unit 24.

In operation the apparatus functions most efficiently when the tension on lines 28 is even. To adjust the tension, spools 46 are loosened so that piston 32 drops to the lowest position permitted by guide rods 47. Each spool 46 is turned until the desired tension is obtained on the corresponding line 28 and then spool plate 60 is fastened to the corresponding key plate 58.

Guide rods 47 should be adjusted so that the top surface of piston 32 travels no lower than flared portion 34 of cylinder 10. This maximizes the efficiency of the pumping process.

In normal operation, as float unit 24 travels upward on the crest of a wave, piston 32 advances within cylinder 10 forcing water up pipe 12. As float unit 24 begins to descend, piston 32 begins to descend as a result of gravity acting on it and weight 44. Ball 20 settles in chamber 22 prohibiting the water forced up pipe 12 from returning to cylinder 10. At the same time one-way valve 38 opens permitting water to flow from the body of piston 32 into the volume of cylinder 10 not occupied by piston 32. Upon the next wave piston 32 again forces the water occupying cylinder 10 into pipe 12. As the water reaches the top of pipe 12 it can be directed downward in a controlled manner to perform any number of useful functions such as, for example, turning a turbine of an electric generator.

The capacity of the present invention can be easily increased in several ways. For example, the diameter of cylinder 32 may be increased. Also, the units may be clustered, e.g., by using a tower frame to support any number of units and combining their outputs.

As high tide, approaches the average position of float unit 24 and therefore piston 32 rises. Eventually, piston 32 will rise so high that as a wave approaches, plate 40 or the top of frame 30 will hit against flared portion 34 of piston 10 thus creating more tension on lines 28. As a result, float unit 24 will become more submerged than usual, causing control float 54 to rest upon the water. As float unit 24 submerges even further, ratchet control arm 56 rises with respect to float unit 24 causing pawl 52 to release ratchet 50. Lines 28 then unwind from spools 46 until pawl 52 reengages with ratchet 50 and the apparatus returns to normal operation.

As the tide becomes lower, the average position of cylinder 32 becomes lower. Eventually, the downward travel of piston 32 will be limited by guide rods 47. Counterweight 68 through line 62 wrapped around sheave 64 then causes shaft 48 to turn in such a direction as to wrap lines 28 around spools 46 in order to take up the slack in and maintain the tension on lines 28. Thus as the tide becomes lower, piston 32 will never drop below the distance of travel permitted by guide rods 47. As each wave begins to build from the previous trough, piston 32 and frame 30 will always be lifted from the seat upon the nuts on guide rods 47 to force water up pipe 12. The efficiency of the apparatus is thereby maintained independent of the average water level.

The simplicity of the components of the present invention makes the same ideally suited for mass production. Assembly is equally economical in that the major components can be assembled on land and floated to the location chosen for operation.

In the case of an approaching storm, one advantage of the present invention is that it can be disassembled extremely rapidly. Counterweight 68 is blocked to prohibit any further movement, nylon lines 28 are cut in order to separate float unit 24 from piston 32 and the pin in gate 72 is pulled so that float unit 24 is freed from the remainder of the apparatus. Float unit 24 can then be towed to a sheltered area.

Although only one exemplary embodiment of this invention has been described in detail above, those skilled in the art will readily appreciate that many modifications are possible in the exemplary embodiment without materially departing from the scope of this invention. For example, vertically extending pipe 12 could be replaced by a large container of any dimension. Also, one-way valves 18 and 38 could be of any other conventional design and located in other locations and still serve the same function. Accordingly, all such modifications are intended to be included within the scope of this invention as defined by the following claims.

What is claimed is:

1. Wave-actuated energy transfer apparatus comprising:

a hollow cylinder having an open bottom and a top with an opening;

water-containing means connected to said cylinder opening;

means for supporting said cylinder and said containing means so that said cylinder and said containing means remain substantially stable with respect to the waves, said supporting means positioning said open bottom of said cylinder below the surface of a body of water and positioning said containing means so that said containing means extends above the surface of said body of water;

a float member;

a piston having an outer diameter such that said piston is insertable into said cylinder to displace fluid located therein;

flexible connecting means for connecting said float member to said piston so that as the waves alter the vertical position of said float member, said piston moves synchronously within said cylinder;

means for admitting water to said cylinder, said means for admitting prohibiting water from leaving said cylinder;

a one-way valve in said water-containing means permitting water to flow away from, but prohibiting water from flowing toward said cylinder so that, as said piston moves into said cylinder synchronously with the movement of said float member, said piston forces water into said water-containing means, but as said piston motion reverses, the water remains in said water containing means; and means for controlling the length of said connecting means between said float member and said piston so that the range of motion of said piston does not change as the average level of said body of water changes.

2. Apparatus as in claim 1 further comprising guiding means movably attached to said cylinder and said piston for guiding said piston within said cylinder and for limiting the travel of said piston away from said cylinder.

3. Apparatus as in claim 2 wherein said controlling means comprises:
a shaft rotatably attached to said float member, said connecting means being attached to and wrapped around said shaft;
a ratchet rigidly attached to said shaft;
a pawl associated with said ratchet, said pawl and the teeth of said ratchet being arranged to prohibit the unwinding of said connecting means while the pawl is engaged;
a float control means attached to said pawl, for disengaging said pawl when said float member becomes submerged to a predetermined extent, so that when said body of water rises after said piston has advanced as far as possible within said cylinder, said float member becomes more submerged, causing said pawl to disengage from said ratchet and causing said connecting means to unwind from said shaft;
a counterweight; and
another flexible connecting means for connecting said counterweight to said shaft, said another connecting means being wrapped around said shaft in a direction opposite to said connecting means so that whenever said piston reaches the farthest position from said cylinder permitted by said guiding means, said counterweight causes said shaft to turn so as to maintain the tension on said connecting means.

4. Apparatus as in claim 1 further comprising:
a shaft attached to said float member;
spools rotatably mounted on said shaft, each of said connecting means being respectively attached to and wrapped around one of said spools;
means for independently rigidly attaching said spools to said shaft so that the tensions in said connecting means can be balanced.

5. Apparatus as in claim 1 wherein said water containing means is a pipe extending vertically at least twenty-five feet above the surface of the water.

6. Apparatus as in claim 5 wherein said float member is movably attached to said pipe and rides along the pipe synchronously with said waves.

7. Apparatus as in claim 6 wherein said float member is comprised of gate means for attaching said float member to said pipe, said gate means being held closed by a pin so that when said apparatus must be disassembled rapidly, said pin is pulled and said connecting means are cut so that said float member may be floated to shelter.

8. Apparatus as in claim 1 wherein said supporting means is a stationary support.

9. Apparatus as in claim 1 wherein said supporting means is a floating support.

10. Apparatus as in claim 1 wherein said one-way valve comprises:
a hollow ball having a plurality of small holes permitting said ball to fill with water; and
a valve chamber having an entrance upon which said ball seats when the upward force of water through said entrance is less than the downward force of water in said water containing means.

11. Apparatus as in claim 1 wherein said first connecting means is a plurality of nylon ropes.

12. Wave-actuated energy transfer apparatus comprising:
a hollow cylinder having an open bottom and a top with an opening;
water-containing means connected to said cylinder opening;
means for supporting said cylinder and said containing means so that said cylinder and said containing means remain substantially stable with respect to the waves, said supporting means positioning said open bottom below the surface of a body of water and positioning said containing means so that said containing means extends at least partially above the surface of said body of water;
a float member;
a piston having an outer diameter slightly smaller than the inner diameter of said cylinder;
first flexible connecting means for connecting said float member to said piston so that as the waves alter the vertical position of said float member, said piston moves synchronously within said cylinder;
a first one-way valve permitting water to flow into, but prohibiting water from flowing out from the portion of said cylinder above said piston;
a second one-way valve in said water-containing means permitting water to flow away from, but prohibiting water from flowing toward said cylinder so that as said piston drives further into said cylinder synchronously with the movement of said float member, said piston forces water into said water containing means, but as said piston motion reverses, said water remains in said water-containing means;
guiding means movably attached to said cylinder and said piston for guiding said piston within said cylinder and for limiting the travel of said piston away from said cylinder;
a shaft rotatably attached to said float member, said first connecting means being attached to and wrapped around said shaft;
a ratchet rigidly attached to said shaft;
a pawl associated with said ratchet, said pawl and the teeth of said ratchet being arranged to prohibit the unwinding of said first connecting means while the pawl is engaged;
a float control means attached to said pawl for disengaging said pawl when said float member becomes submerged to a predetermined extent, so that when said body of water rises after said piston has advanced as far as possible within said cylinder, said float member becomes more submerged, causing said pawl to disengage from said ratchet and causing said first connecting means to unwind from said shaft;

a counterweight; and a second flexible connecting means for connecting said counterweight to said shaft; said second connecting means being wrapped around said shaft in a direction opposite to said first connecting means so that whenever said piston reaches the farthest position from said cylinder permitted by said guiding means, said counterweight causes said shaft to turn so as to maintain the tension on said first connecting means.

13. Apparatus as in claim 12 further comprising:

spools rotatably mounted on said shaft, each of said first connection means being respectively attached to and wrapped around one of said spools;

means for independently rigidly attaching said spools to said shaft so that the tensions in said first connecting means can be balanced.

14. Apparatus as in claim 12 wherein said water-containing means is a pipe extending vertically at least twenty-five feet above the surface of the water.

15. Apparatus as in claim 14 wherein said float member is movably attached to said pipe and rides along the pipe synchronously with said waves.

16. Apparatus as in claim 15 wherein said float member is comprised of gate means for attaching said float member to said pipe, said gate means being held closed by only a pin so that when said apparatus must be disassembled rapidly, said pin is pulled and said first connecting means are cut so that said float member may be floated to shelter.

17. Apparatus as in claim 12 wherein said supporting means is a stationary support.

18. Apparatus as in claim 12 wherein said supporting means is a large floating support.

19. Apparatus as in claim 12 wherein said second one-way valve comprises:

a hollow ball having a plurality of small holes permitting said ball to fill with water; and a valve chamber having an entrance upon which said ball seats when the upward force of water through said entrance is less than the downward force of water in said water-containing means.

20. Apparatus as in claim 12 wherein said first connecting means is a plurality of nylon ropes.

* * * * *